May 16, 1961 J. H. KUNKLE 2,984,714
EXTENSIBLE ELECTRICAL OUTLET CONNECTION
Filed Aug. 8, 1958 2 Sheets-Sheet 1
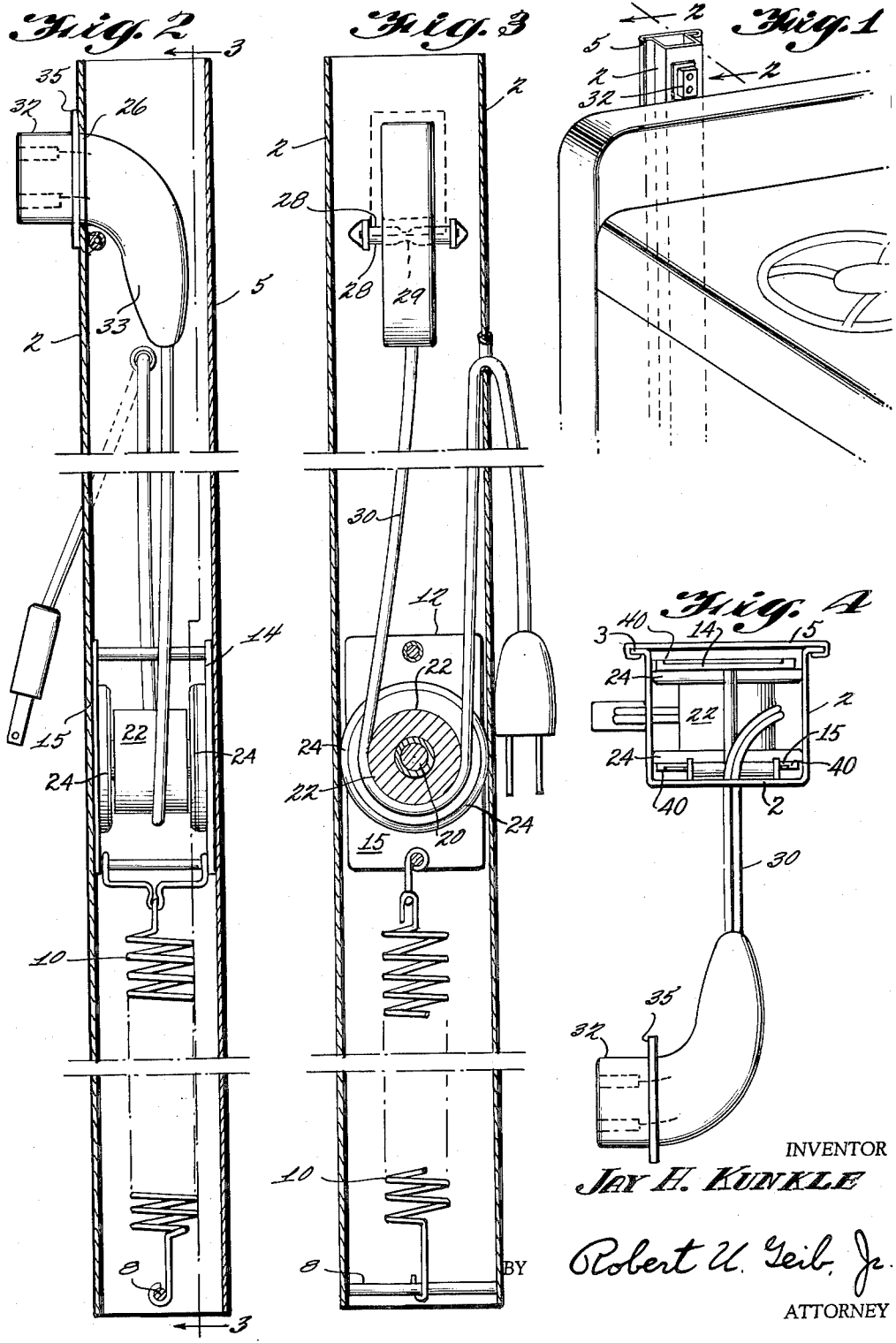
INVENTOR
JAY H. KUNKLE
BY Robert U. Geib, Jr.
ATTORNEY May 16, 1961 J. H. KUNKLE 2,984,714
EXTENSIBLE ELECTRICAL OUTLET CONNECTION
Filed Aug. 8, 1958 2 Sheets-Sheet 2
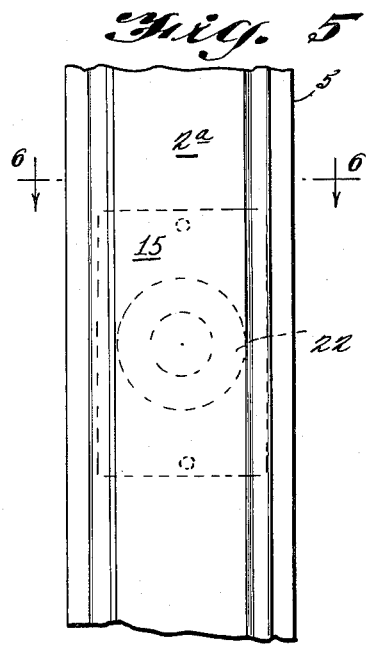
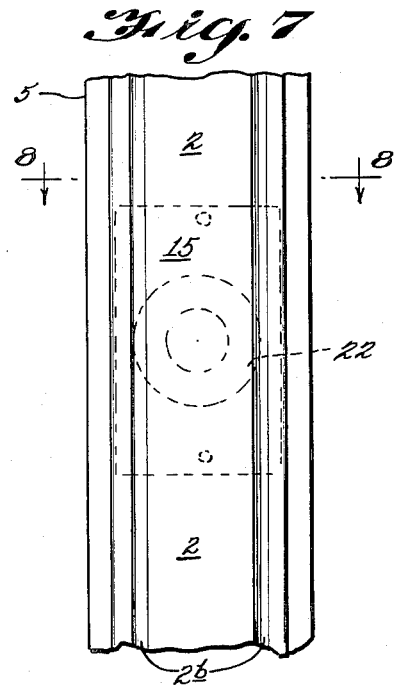
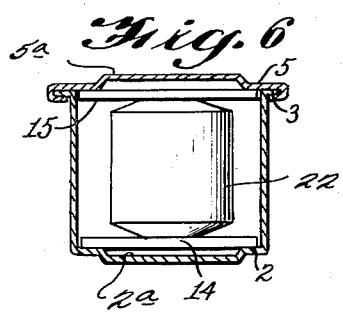
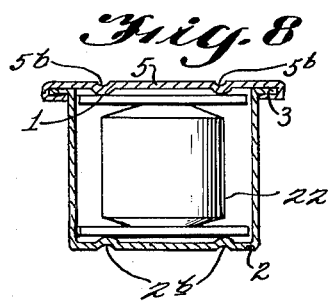
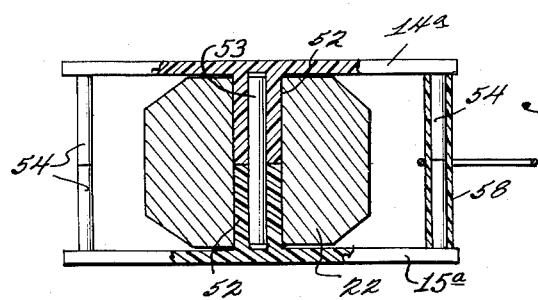
INVENTOR
JAY H. KUNKLE
BY Robert U. Teib, Jr.
ATTORNEY

2,984,714
EXTENSIBLE ELECTRICAL OUTLET CONNECTION

Jay H. Kunkle, 612 Jean St., Greensburg, Pa.

Filed Aug. 8, 1958, Ser. No. 753,981

8 Claims. (Cl. 191—12)

This invention relates to an extensible electrical outlet connection comprising a housing, together with a substantial length of electrical cord which is adapted to be easily and quickly moved into and out of the same as the occasion requires.

In numerous places, such as in household kitchens, for example, it frequently happens that but one electrical outlet terminal is utilized for connection with various electrical utensils, such as iron, coffee pot, waffle iron, toaster, mixer, etc., all of which are usually provided with rather lengthy attachment cords. The length of all of these electrical cables, or cords, results in a cumbersome situation.

The present invention contemplates the provision of an extensible (and retractable) electrical outlet connection or terminal which permits the ready association therewith of utensils whose attaching cords are purposefully foreshortened, this combination thereby eliminating the cumbersome situation referred to.

Another object is the provision of a unitary and compact extensible and retractable electrical outlet for efficiently achieving the desired ends which is durable and simple, and inexpensive to manufacture and install.

The invention, then, comprises the features hereinafter fully described and as particularly pointed out in the claims, the following description and the annexed drawings setting forth in detail certain illustrative embodiments of the invention, these being indicative of several ways in which the principles of the invention may be employed.

In said drawings:

Figure 1 is a perspective illustrating schematically the manner in which the apparatus of the present invention might be utilized in a conventional household kitchen;

Figure 2 is an enlarged elevational sectional view taken on the line 2—2 of Figure 1;

Figure 3 is a sectional view taken on the line 3—3 of Figure 2;

Figure 4 is a top or plan view;

Figure 5 is a fragmentary elevational view illustrating a modified form of the present invention;

Figure 6 is a sectional view taken on the line 6—6 of Figure 5;

Figure 7 is a fragmentary elevational view illustrating a second modification;

Figure 8 is a sectional view taken on the line 8—8 of Figure 7; and

Figure 9 is an exploded view illustrating a further modification, the same comprising a form of sliding block which may acceptably be made of plastic or the like.

Referring more particularly to the drawings, the numeral 2 generally designates an elongate housing for the apparatus of the present invention, the main body portion of which is shown as comprising a rectangular channel with the edges thereof providing outwardly extending narrow flanges 3 (see Figures 4, 6 and 8).

Cooperating with the housing 2 is a cover plate 5, the major or body portion of which is substantially flat with its side edges reversely bent and inwardly extending to provide recesses of such size and shape as will receive the aforementioned flanges 3. The terminal extremities of the housing 2 and/or the cover plate 5 may be provided with suitable closure devices which, as such, form no part of the present invention, and which are, therefore, neither illustrated herein, nor referred to hereinafter.

Referring to Figure 3, a pin 8 extends across the housing 2 adjacent one end thereof for securing one end of a coil spring 10, the other end of which is connected to a sliding block generally indicated at 12.

The sliding block 12 is provided with a pair of spaced inner and outer face plates 14 and 15 which are respectively disposed adjacent the inner surface of the bottom of the channel forming the housing 2 (when viewed in cross-section) and the inner face of the cover plate 5.

In view of the fact that this sliding block 12 is intended to be repeatedly moved along and within the space provided by the interior of the housing, it is important that frictional contact with the housing be reduced as much as practicable; and this may be accomplished in a number of different ways, several of which will be specifically referred to hereinafter.

A pin 20 is disposed to extend between, and connect, the approximate center portions of the face plates 14 and 15 with its ends either fixed or rotatable, as desired. As shown is Figure 3, this pin 20 carries an intermediately disposed freely rotatable barrel 22 with an independently rotatable disk 24 disposed at each end thereof.

It will be observed that the disks 24 are of such diameter that their peripheries project beyond the side edges of the face plates 14 and 15 (see Figures 2 and 3), thereby enabling them to freely contact the side walls of the channel of the housing 2.

Disposed adjacent the end of the housing which is remote from the pin 8 is an aperture 26 which may be in either the bottom wall of the channel 2 or in the flat body portion of the cover plate 5. In either event, a small roller 28 is rotatably mounted adjacent the inner lip of the aperture 26, the said roller being provided with a groove 29 of such size and shape as will efficiently receive the body portion of a conventional electrical outlet cord, as indicated at 30.

It will be perceived that the construction and arrangement of the small roller 28 is such as to leave unobscured a substantial portion of the aperture 26, the purpose of which will be later described.

As shown in Figure 3, the electrical outlet cord 30 is of considerable length, one end thereof extending through a hole 26 in an appropriate portion of either the channel 2 or cover plate 5 for connection with a suitable source of power.

The main body portion of the electrical outlet cord 30 is trained around the rotatable barrel 22 on the pin 20 which, together with the independently rotatable disk 24 at either end thereof, comprise a pulley, the other end thereof being directed over the small roller 28 and outwardly of the aperture 26. Secured to this end of the outlet cord 30 is an outlet plug 32 which is of foreshortened gooseneck construction as viewed in elevation. The inner end 33 of this gooseneck outlet plug 32 is adapted for disposition inside the housing 2, the outer face of said plug being provided with a flange 35 for preventing its dropping into the housing. The immediately foregoing construction and arrangement permits of a flush relationship when the electrical cord 30 is in fully retracted position; and, in fact, the gooseneck outlet plug 32 may be utilized without removal from the aperture 26.

On the other hand, the gooseneck outlet plug 32 may be removed from the housing as far as the length of the electrical cord 30 will permit, the latter rotating on the pulley provided by the rotatable barrel 22 and its cooperating disk 24, the withdrawal action being resiliently opposed by the coil spring 10. Due to the fact that the barrel 22 is freely rotatable on the pin 20, and the disks 24 at either end thereof are independently rotatable both with respect to the barrel 22 and with respect to the pin 20, friction against the electrical outlet cord 30 is considerably reduced.

As previously stated, the present invention contemplates several modifications in the sliding block 12.

It will be observed that, in the interests of reducing friction, the side edges of the face plates 14 and 15 of the sliding block 12 are undercut to provide a thin surface contacting ridge 40 as shown in Figure 4.

Referring to Figures 5 through 8, two modifications are shown which eliminate from the sliding block 12 the rotatable disks 24 and, in lieu thereof, provide for freely sliding contact of the face plates 14 and 15 with the bottom of the channel forming the housing 2 and the inner face of the cover plate 5, respectively. More specifically, the construction of Figures 5 and 6 provide for recessing, as at 2a and 5a, in the inner faces of the elements 2 and 5 over a substantial portion of their widths, thereby providing reduced contact areas along the outer faces of the face plates 14 and 15 and adjacent their outer edges. In Figures 7 and 8, on the other hand, the elements 2 and 5 (i.e., the bottom of the channel forming the housing and the face plate) are provided adjacent their outer edges with inwardly extending ribs, as shown at 2b and 5b, respectively.

Referring to Figure 9, another modification contemplates a sliding block which is composed to a considerable extent of plastic, or other suitable material. According to this embodiment, the face plates 14a and 15a may be similar in shape to those previously described, but which are provided with an integrally formed, centrally disposed, inwardly extending opposed sleeves 52 which abut and are connected by a telescoping dowel pin 53. In addition, the ends of the face plates 14a and 15a are provided with opposed pins or tubes 54 over which there is placed a telescoping sleeve 58.

While I have shown and described several specific embodiments of the present invention, it will be readily understood by those skilled in the art that I do not wish to be limited exactly thereto, since various modifications may be made without departing from the scope of the invention as defined in the appended claims.

I claim:

1. A unitary extensible electrical outlet connection comprising an elongate channel including a bottom wall connected by two parallel side walls, the outer edges of which are provided with flanges which extend outwardly at approximately 90°, a cover plate for the open face of said channel, the inner side of said cover plate having recesses for receiving the flanges of said channel, a member disposed in said channel and adapted for longitudinal movement with respect thereto, said member being resiliently influenced toward one end of said channel, a pin carried by said member and extending transversely of said channel, a barrel rotatably mounted on said pin, a disk disposed at either end of said barrel and freely rotatable with respect to both said pin and said barrel, said channel having an aperture at a point which is remote from the end toward which said member is influenced, an electrical outlet cord disposed in said channel, said outlet cord being trained around said rotatable barrel and adapted to extend through and project from said aperture, and an electrical outlet plug connected to the end of said electrical outlet cord which extends through said aperture.

2. A unitary extensible electrical outlet connection comprising an elongate channel including a bottom wall connected by two parallel side walls, the outer edges of which are provided with flanges which extend outwardly at approximately 90°, a cover plate for the open face of said channel, the inner side of said cover plate having recesses for receiving the flanges of said channel, a member disposed in said channel and adapted for longitudinal movement with respect thereto, said member being resiliently influenced toward one end of said channel, a pin carried by said member and extending transversely of said channel, a barrel rotatably mounted on said pin, a disk disposed at either end of said barrel and freely rotatable with respect to both said pin and said barrel, said channel having an aperture at a point which is remote from the secured end toward which said member is influenced, an electrical outlet cord disposed in said channel, said outlet cord being trained around said rotatable barrel and adapted to extend through and project from said aperture, and an electrical outlet plug connected to the end of said electrical outlet cord which extends through said aperture, said electrical outlet plug being adapted to at least partially seat in said aperture and to be freely removable therefrom.

3. A unitary extensible electrical outlet connection comprising an elongate channel including a bottom wall connected by two parallel side walls, the outer edges of which are provided with flanges which extend outwardly at approximately 90°, a cover plate for the open face of said channel, the inner side of said cover plate having recesses for receiving the flanges of said channel, a member disposed in said channel and adapted for longitudinal movement with respect thereto, said member being resiliently influenced toward one end of said channel, a pin carried by said member and extending transversely of said channel, a barrel rotatably mounted on said pin, a disk disposed at either end of said barrel and freely rotatable with respect to both said pin and said barrel, said channel having an aperture at a point which is remote from the secured end toward which said member is influenced, an antifriction element adjacent said aperture, an electrical outlet cord disposed in said channel, said electrical outlet cord being trained around said rotatable barrel and said antifriction element and adapted to extend through and project from said aperture, and an electrical outlet plug connected to the end of said electrical outlet cord which extends through said aperture.

4. A unitary extensible electrical outlet connection comprising an elongate channel including a bottom wall connected by two parallel side walls, the outer edges of which are provided with flanges which extend outwardly at approximately 90°, a cover plate for the open face of said channel, the inner side of said cover plate having recesses for receiving the flanges of said channel, a coil spring in said channel, one end of said coil spring being secured in position adjacent one end of said channel, a member disposed in said channel and adapted for longitudinal movement with respect thereto, a pin carried by said member and extending transversely of said channel, a barrel rotatably mounted on said pin, a disk disposed at either end of said barrel and freely rotatable with respect to both said pin and said barrel, said housing having an aperture at a point which is remote from the secured end of said coil spring, an electrical outlet cord disposed in said channel, said electrical outlet cord being trained around said rotatable barrel and adapted to extend through and project from said aperture, and an electrical outlet plug connected to the end of said electrical outlet cord which extends through said aperture.

5. A unitary extensible electrical outlet connection comprising an elongate channel including a bottom wall connected by two parallel side walls, the outer edges of which are provided with flanges which extend outwardly at approximately 90°, a cover plate for the open face of said channel, the inner side of said cover plate having recesses for receiving the flanges of said channel, a coil spring in said channel, one end of said coil spring being secured in position adjacent one end of said channel, a slidable member disposed in said channel, said slidable member including a pair of spaced parallel side plates connected adjacent their midportions by a transverse pin, a barrel rotatably mounted on said pin, a disk disposed at either end of said rotatable barrel and freely rotatable with respect to both said pin and said barrel, said channel having an aperture at a point which is remote from the secured end of said coil spring, an antifriction element adjacent said aperture, an electrical outlet cord disposed in said channel, said electrical outlet cord being trained around said rotatable barrel and said antifriction element and adapted to extend through and project from said aperture, and an electrical outlet plug connected to the end of said electrical outlet cord which extends through said aperture.

6. A unitary extensible electrical outlet connection comprising an elongate channel including a bottom wall connected by two parallel side walls, the outer edges of which are provided with flanges which extend outwardly at approximately 90°, a cover plate for the open face of said channel, the inner side of said cover plate having recesses for receiving the flanges of said channel, said cover plate being a removable cover plate, a coil spring in said channel, one end of said coil spring being secured in position adjacent one end of said channel, a member disposed in said channel and adapted for longitudinal movement with respect thereto, a pin carried by said member and extending transversely of said channel, a barrel rotatably mounted on said pin, a disk disposed at either end of said barrel and freely rotatable with respect to both said pin and said barrel, said channel having an aperture at a point which is remote from the secured end of said coil spring, an antifriction element adjacent said aperture, an electrical outlet cord disposed in said channel, said electrical outlet cord being trained around said rotatable barrel and said antifriction element and adapted to extend through and project from said aperture, and an electrical outlet plug connected to the end of said electrical outlet cord which extends through said aperture.

7. A unitary extensible electrical outlet connection comprising an elongate channel including a bottom wall connected by two parallel side walls, the outer edges of which are provided with flanges which extend outwardly at approximately 90°, a cover plate for the open face of said channel, the inner side of said cover plate having recesses for receiving the flanges of said channel, a coil spring in said channel, one end of said coil spring being secured in position adjacent one end of said channel, a slidable member disposed in said channel, said slidable member including a pair of spaced parallel side plates connected adjacent their midportions by a transverse pin, a barrel rotatably mounted on said pin, a disk disposed at either end of said rotatable barrel and freely rotatable with respect to both said pin and said barrel, said channel having an aperture at a point which is remote from the secured end of said coil spring, an electrical outlet cord disposed in said channel, said electrical outlet cord being trained around said rotatable barrel and adapted to extend through and project from said aperture, and an electrical outlet plug connected to the end of said electrical outlet cord which extends through said aperture.

8. A unitary extensible electrical outlet connection comprising an elongate channel including a bottom wall connected by two parallel side walls, the outer edges of which are provided with flanges which extend outwardly at approximately 90°, a cover plate for the open face of said channel, the inner side of said cover plate having recesses for receiving the flanges of said channel, a coil spring in said channel, one end of said coil spring being secured in position adjacent one end of said channel, a slidable member disposed in said channel, said slidable member including a pair of spaced parallel side plates connected adjacent their midportions by a transverse pin, a barrel rotatably mounted on said pin, a disk disposed at either end of said rotatable barrel and freely rotatable with respect to both said pin and said barrel, means for reducing the frictional contact between said slidable member and said channel, said channel having an aperture at a point which is remote from the secured end of said coil spring, an electrical outlet cord disposed in said channel, said electrical outlet cord being trained around said rotatable barrel and adapted to extend through and project from said aperture, and an electrical outlet plug connected to the end of said electrical outlet cord which extends through said aperture.

References Cited in the file of this patent
UNITED STATES PATENTS

| | | |
|---|---|---|
| 637,614 | Howe | Nov. 21, 1899 |
| 693,988 | Taylor | Feb. 25, 1902 |
| 2,280,680 | Wittman | Apr. 21, 1942 |
| 2,292,425 | Abrahamson | Aug. 11, 1942 |
| 2,648,052 | Graham et al. | Aug. 4, 1953 |
| 2,820,112 | Lupu | Jan. 14, 1958 |